United States Patent
Bialer

(10) Patent No.: US 10,338,216 B2
(45) Date of Patent: Jul. 2, 2019

(54) OBJECT DETECTION IN MULTIPLE RADARS

(71) Applicant: GM GLOBAL TECHNOLOGY OPERATIONS LLC, Detroit, MI (US)

(72) Inventor: Oded Bialer, Petah Tivak (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 333 days.

(21) Appl. No.: 15/343,499

(22) Filed: Nov. 4, 2016

(65) Prior Publication Data

US 2018/0128917 A1     May 10, 2018

(51) Int. Cl.
*G01S 13/58* (2006.01)
*G01S 13/93* (2006.01)
*G01S 7/295* (2006.01)
*G01S 13/72* (2006.01)
*G01S 13/87* (2006.01)
*G01S 13/89* (2006.01)

(52) U.S. Cl.
CPC ............ *G01S 13/931* (2013.01); *G01S 7/295* (2013.01); *G01S 13/582* (2013.01); *G01S 13/726* (2013.01); *G01S 13/878* (2013.01); *G01S 13/89* (2013.01); *G01S 2013/9375* (2013.01)

(58) Field of Classification Search
CPC ..... H04W 12/06; H04W 12/08; H04W 74/00; G01S 13/582; G01S 13/726; G01S 13/878; G01S 13/89; G01S 13/931; G01S 2013/9375; G01S 7/295
USPC .......................................................... 343/70
See application file for complete search history.

(56) References Cited

U.S. PATENT DOCUMENTS

| | | | | |
|---|---|---|---|---|
| 2010/0097200 A1* | 4/2010 | Hilsebecher | ............ | G01S 7/412 340/436 |
| 2010/0271255 A1* | 10/2010 | McKitterick | ............. | G01S 3/42 342/27 |
| 2015/0198697 A1* | 7/2015 | Kishigami | ............ | G01S 7/2923 342/145 |
| 2015/0369912 A1* | 12/2015 | Kishigami | ............. | G01S 13/26 342/113 |
| 2017/0205501 A1* | 7/2017 | Liu | ......................... | G01S 7/414 |

* cited by examiner

*Primary Examiner* — Timothy X Pham
(74) *Attorney, Agent, or Firm* — Lorenz & Kopf LLP

(57) ABSTRACT

Methods and systems are provided for controlling a radar system of a vehicle. One or more transmitters are configured to transmit radar signals using a plurality of widely spaced antenna arrays. A plurality of widely spaced antenna arrays are configured to receive return radar signals after the transmitted radar signals are deflected from an object proximate the vehicle. A processor is used to utilize range information to eliminate ghost targets in widely spaced antenna arrays.

16 Claims, 6 Drawing Sheets

OBJECT DETECTION IN MULTIPLE RADARS

TECHNICAL FIELD

The present disclosure generally relates to vehicles, and more particularly relates to methods and radar systems for vehicles.

BACKGROUND

Certain vehicles today utilize radar systems. For example, certain vehicles utilize radar systems to detect other vehicles, pedestrians, or other objects on a road in which the vehicle is travelling. Radar systems may be used in this manner, for example, in implementing automatic braking systems, adaptive cruise control, and avoidance features, among other vehicle features. Certain vehicle radar systems, called multiple input, multiple output (MIMO) radar systems, have multiple transmitters and receivers. While radar systems are generally useful for such vehicle features, in certain situations existing radar systems may have certain limitations.

Accordingly, it is desirable to provide improved techniques for radar system performance in vehicles, for example for classification of objects using widely spaced MIMO radar systems and, in particular, to eliminate ghost objects actively tracked by the radars. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, A method of processing radar target points comprising receiving a first radar signal indicating a first target and a second target within a first field of view at a first distance from a first location, receiving a second radar signal indicating a third target and a fourth target with the first field of view at a second distance from a second location, determining a true target in response to the first target and the third target being collocated, and deducting the second target from the first radar signal and deducting the fourth target from the second radar signal In accordance with an exemplary embodiment, a radar control system for a vehicle is provided. The apparatus comprises a first antenna at a first location for receiving a first radar signal where the first radar signal indicates a first target and a second target at a first range, a second antenna at a second location for receiving a second radar signal where the second radar signal indicates a third target and a fourth target at a second range, and a processor coupled to the first antenna and the second antenna for determining that the first target and the third target are collocated and for deducting the second target from the first radar signal and the fourth target from the second radar signal.

In accordance with an exemplary embodiment, method of resolving a radar target comprising receiving a first radar signal indicating a first target and a second target at a first range, receiving a second radar signal indicating a third target and a fourth target at a second range, determining a true target in response to the first range and the second range intersecting at the location of the first target and the third target, and deducting the second target from the first radar signal and deducting the fourth target from the second radar signal.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
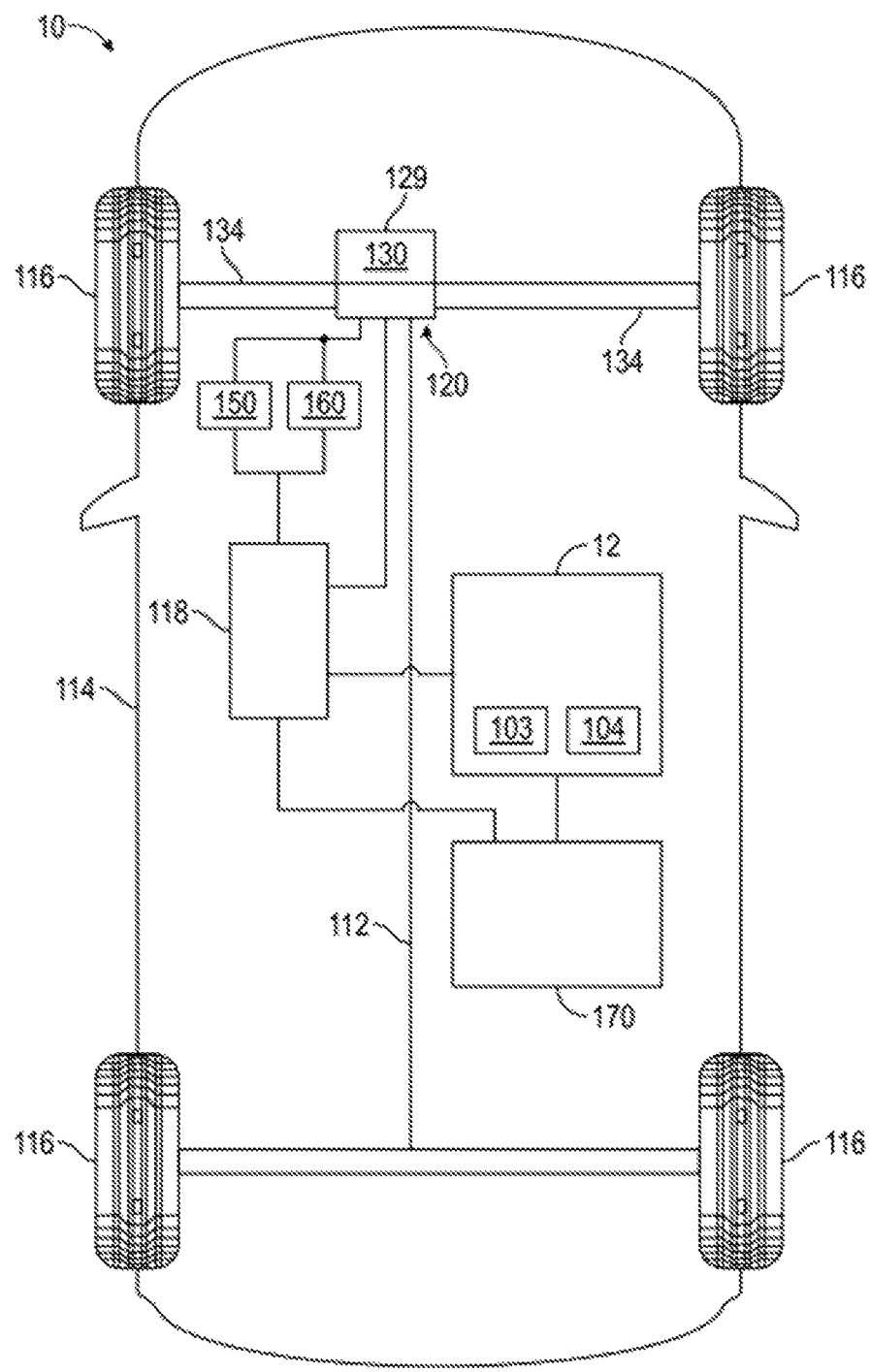
FIG. 1 is a functional block diagram of a vehicle having a control system, including a radar system, in accordance with an exemplary embodiment.

FIG. 1 provides a functional block diagram of vehicle 10, in accordance with an exemplary embodiment. As described in further detail greater below, the vehicle 10 includes a radar control system 12 having a radar system 103 and a controller 104 that classifies objects based upon a three dimensional representation of the objects using received radar signals of the radar system 103.

In the depicted embodiment, the vehicle 10 also includes a chassis 112, a body 114, four wheels 116, an electronic control system 118, a steering system 150, and a braking system 160. The body 114 is arranged on the chassis 112 and substantially encloses the other components of the vehicle 10. The body 114 and the chassis 112 may jointly form a frame. The wheels 116 are each rotationally coupled to the chassis 112 near a respective corner of the body 114.

In the exemplary embodiment illustrated in FIG. 1, the vehicle 10 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is also mechanically coupled to a transmission. In other embodiments, the engine 130 may instead be coupled to a generator used to power an electric motor that is mechanically coupled to a transmission.

The steering system 150 is mounted on the chassis 112, and controls steering of the wheels 116. The steering system 150 includes a steering wheel and a steering column (not depicted). The steering wheel receives inputs from a driver of the vehicle 10. The steering column results in desired steering angles for the wheels 116 via the drive shafts 134 based on the inputs from the driver.

The braking system 160 is mounted on the chassis 112, and provides braking for the vehicle 10. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle 10, as well as various other inputs for various vehicle devices and/or systems, such as one or more vehicle radios, other entertainment or infotainment systems, environmental control systems, lightning units, navigation systems, and the like (not depicted in FIG. 1).

Also as depicted in FIG. 1, in certain embodiments the vehicle 10 may also include a telematics system 170. In one such embodiment the telematics system 170 is an onboard device that provides a variety of services through communication with a call center (not depicted) remote from the vehicle 10. In various embodiments the telematics system may include, among other features, various non-depicted features such as an electronic processing device, one or more types of electronic memory, a cellular chipset/component, a wireless modem, a dual mode antenna, and a navigation unit containing a GPS chipset/component. In certain embodiments, certain of such components may be included in the controller 104, for example as discussed further below in connection with FIG. 2. The telematics system 170 may provide various services including: turn-by-turn directions and other navigation-related services provided in conjunction with the GPS chipset/component, airbag deployment notification and other emergency or roadside assistance-related services provided in connection with various sensors and/or sensor interface modules located throughout the vehicle, and/or infotainment-related services such as music, internet web pages, movies, television programs, videogames, and/or other content.

The radar control system 12 is mounted on the chassis 112. As mentioned above, the radar control system 12 classifies objects based upon a three dimensional representation of the objects using received radar signals of the radar system 103. In one example, the radar control system 12 provides these functions in accordance with the method 400 described further below in connection with FIG. 4.

While the radar control system 12, the radar system 103, and the controller 104 are depicted as being part of the same system, it will be appreciated that in certain embodiments these features may comprise two or more systems. In addition, in various embodiments the radar control system 12 may comprise all or part of, and/or may be coupled to, various other vehicle devices and systems, such as, among others, the actuator assembly 120, and/or the electronic control system 118.

Figure 2:
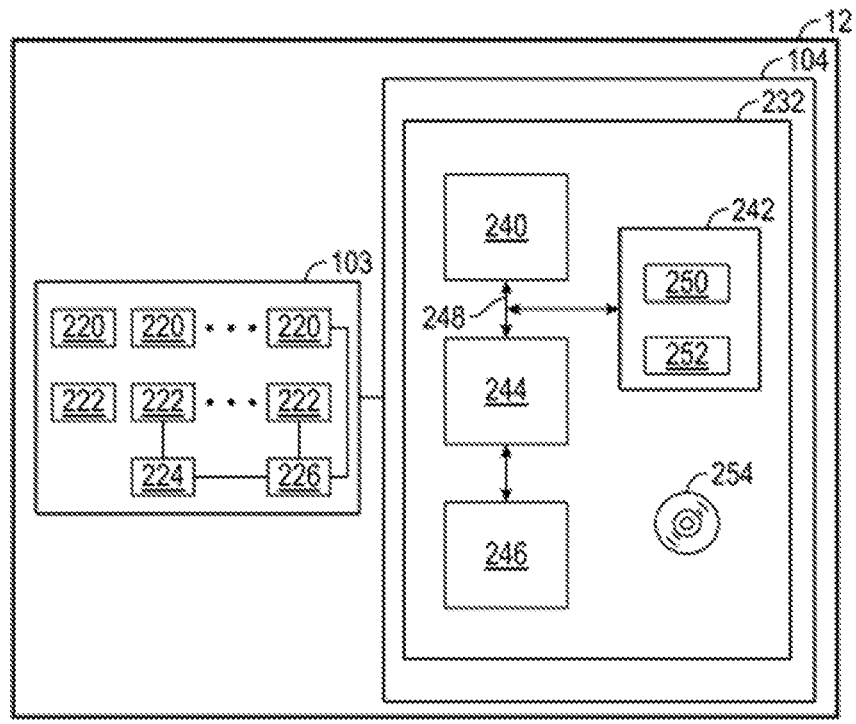
FIG. 2 is a functional block diagram of the control system of the vehicle of FIG. 1, including the radar system, in accordance with an exemplary embodiment.

With reference to FIG. 2, a functional block diagram is provided for the radar control system 12 of FIG. 1, in accordance with an exemplary embodiment. As noted above, the radar control system 12 includes the radar system 103 and the controller 104 of FIG. 1.

As depicted in FIG. 2, the radar system 103 includes one or more transmitters 220, one or more receivers 222, a memory 224, and a processing unit 226. In the depicted embodiment, the radar system 103 comprises a multiple input, multiple output (MIMO) radar system with multiple transmitters (also referred to herein as transmission channels) 220 and multiple receivers (also referred to herein as receiving channels) 222. The transmitters 220 transmit radar signals for the radar system 103. After the transmitted radar signals contact one or more objects on or near a road on which the vehicle 10 is travelling and is reflected/redirected toward the radar system 103, the redirected radar signals are received by the receivers 222 of the radar system 103 for processing.

Figure 3:
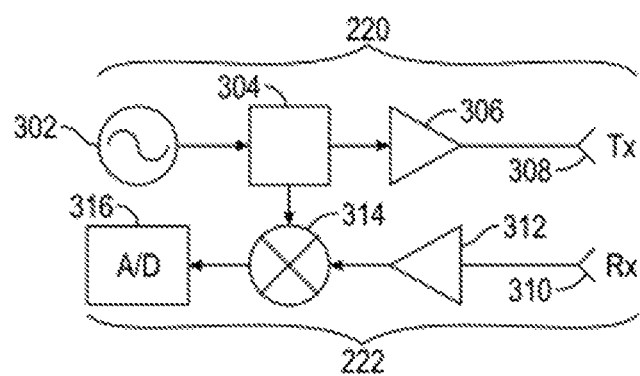
FIG. 3 is a functional block diagram of a transmission channel and a receiving channel of the radar system of FIGS. 1 and 2, in accordance with an exemplary embodiment.

With reference to FIG. 3, a representative one of the transmission channels 220 is depicted along with a respective one of the receiving channels 222 of the radar system of FIG. 3, in accordance with an exemplary embodiment. As depicted in FIG. 3, each transmitting channel 220 includes a signal generator 302, a filter 304, an amplifier 306, and an antenna 308. Also as depicted in FIG. 3, each receiving channel 222 includes an antenna 310, an amplifier 312, a mixer 314, and a sampler/digitizer 316. In certain embodiments the antennas 308, 310 may comprise a single antenna, while in other embodiments the antennas 308, 310 may comprise separate antennas. Similarly, in certain embodiments the amplifiers 306, 312 may comprise a single amplifier, while in other embodiments the amplifiers 306, 312 may comprise separate amplifiers. In addition, in certain embodiments multiple transmitting channels 220 may share one or more of the signal generators 302, filters 304, amplifiers 306, and/or antennae 308. Likewise, in certain embodiments, multiple receiving channels 222 may share one or more of the antennae 310, amplifiers 312, mixers 314, and/or samplers/digitizers 316.

The radar system 103 generates the transmittal radar signals via the signal generator(s) 302. The transmittal radar signals are filtered via the filter(s) 304, amplified via the amplifier(s) 306, and transmitted from the radar system 103 (and from the vehicle 10 to which the radar system 103 belongs, also referred to herein as the "host vehicle") via the antenna(e) 308. The transmitting radar signals subsequently contact other vehicles and/or other objects on or alongside the road on which the host vehicle 10 is travelling. After contacting the other vehicles and/or other objects, the radar signals are reflected, and travel from the other vehicles and/or other objects in various directions, including some signals returning toward the host vehicle 10. The radar signals returning to the host vehicle 10 (also referred to herein as received radar signals) are received by the antenna(e) 310, amplified by the amplifier(s) 312, mixed by the mixer(s) 314, and digitized by the sampler(s)/digitizer(s) 316.

Returning to FIG. 2, the radar system 103 also includes, among other possible features, the memory 224 and the processing unit 226. The memory 224 stores information received by the receiver 222 and/or the processing unit 226. In certain embodiments, such functions may be performed, in whole or in part, by a memory 242 of a computer system 232 (discussed further below).

The processing unit 226 processes the information obtained by the receivers 222 for classification of objects based upon a three dimensional representation of the objects using received radar signals of the radar system 103. The processing unit 226 of the illustrated embodiment is capable of executing one or more programs (i.e., running software) to perform various tasks instructions encoded in the program(s). The processing unit 226 may include one or more microprocessors, microcontrollers, application specific integrated circuits (ASICs), or other suitable device as realized by those skilled in the art, such as, by way of example, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

In certain embodiments, the radar system 103 may include multiple memories 224 and/or processing units 226, working together or separately, as is also realized by those skilled in the art. In addition, it is noted that in certain embodiments, the functions of the memory 224, and/or the processing unit 226 may be performed in whole or in part by one or more other memories, interfaces, and/or processors disposed outside the radar system 103, such as the memory 242 and the processor 240 of the controller 104 described further below.

As depicted in FIG. 2, the controller 104 is coupled to the radar system 103. Similar to the discussion above, in certain embodiments the controller 104 may be disposed in whole or in part within or as part of the radar system 103. In addition, in certain embodiments, the controller 104 is also coupled to one or more other vehicle systems (such as the electronic control system 118 of FIG. 1). The controller 104 receives and processes the information sensed or determined from the radar system 103, provides detection, classification, and tracking of based upon a three dimensional representation of the objects using received radar signals of the radar system 103, and implements appropriate vehicle actions based on this information. The controller 104 generally performs these functions in accordance with the method 400 discussed further below in connection with FIGS. 4-6.

As depicted in FIG. 2, the controller 104 comprises the computer system 232. In certain embodiments, the controller 104 may also include the radar system 103, one or more components thereof, and/or one or more other systems. In addition, it will be appreciated that the controller 104 may otherwise differ from the embodiment depicted in FIG. 2. For example, the controller 104 may be coupled to or may otherwise utilize one or more remote computer systems and/or other control systems, such as the electronic control system 118 of FIG. 1.

As depicted in FIG. 2, the computer system 232 includes the processor 240, the memory 242, an interface 244, a storage device 246, and a bus 248. The processor 240 performs the computation and control functions of the controller 104, and may comprise any type of processor or multiple processors, single integrated circuits such as a microprocessor, or any suitable number of integrated circuit devices and/or circuit boards working in cooperation to accomplish the functions of a processing unit. In one embodiment, the processor 240 classifies objects using radar signal spectrogram data in combination with one or more computer vision models. During operation, the processor 240 executes one or more programs 250 contained within the memory 242 and, as such, controls the general operation of the controller 104 and the computer system 232, generally in executing the processes described herein, such as those of the method 400 described further below in connection with FIGS. 4-6.

The memory 242 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 242 is located on and/or co-located on the same computer chip as the processor 240. In the depicted embodiment, the memory 242 stores the above-referenced program 250 along with one or more stored values 252 (such as, by way of example, information from the received radar signals and the spectrograms therefrom).

The bus 248 serves to transmit programs, data, status and other information or signals between the various components of the computer system 232. The interface 244 allows communication to the computer system 232, for example from a system driver and/or another computer system, and can be implemented using any suitable method and apparatus. The interface 244 can include one or more network interfaces to communicate with other systems or components. In one embodiment, the interface 244 includes a transceiver. The interface 244 may also include one or more network interfaces to communicate with technicians, and/or one or more storage interfaces to connect to storage apparatuses, such as the storage device 246.

The storage device 246 can be any suitable type of storage apparatus, including direct access storage devices such as hard disk drives, flash systems, floppy disk drives and optical disk drives. In one exemplary embodiment, the storage device 246 comprises a program product from which memory 242 can receive a program 250 that executes one or more embodiments of one or more processes of the present disclosure, such as the method 400 (and any sub-processes thereof) described further below in connection with FIGS. 4-6. In another exemplary embodiment, the program product may be directly stored in and/or otherwise accessed by the memory 242 and/or a disk (e.g., disk 254), such as that referenced below.

The bus 248 can be any suitable physical or logical means of connecting computer systems and components. This includes, but is not limited to, direct hard-wired connections, fiber optics, infrared and wireless bus technologies. During operation, the program 250 is stored in the memory 242 and executed by the processor 240.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 240) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 232 may also otherwise differ from the embodiment depicted in FIG. 2, for example in that the computer system 232 may be coupled to or may otherwise utilize one or more remote computer systems and/or other control systems.

Figure 4:
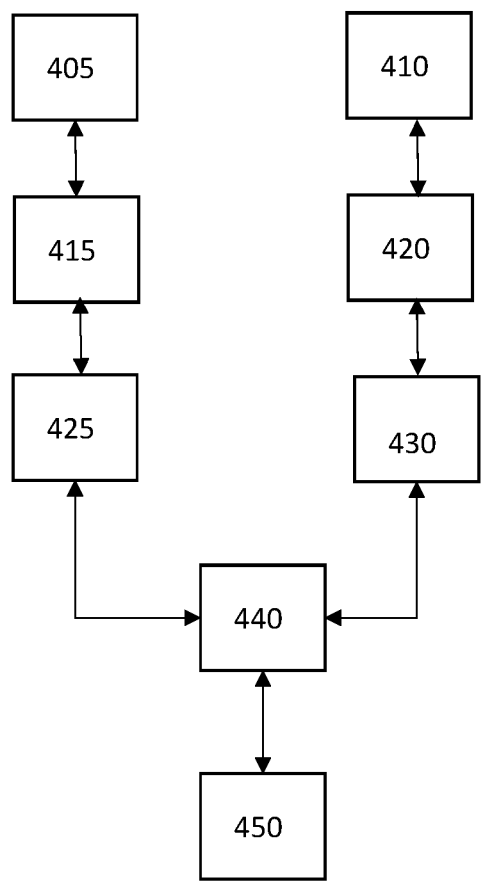
FIG. 4 shows an exemplary environment for implementing a system and method for static clutter mitigation for dynamic target localization in accordance with an exemplary embodiment.

Turning now to FIG. 4, an apparatus for parallel radar signal processing 400 is shown. The apparatus is, according to an exemplary embodiment, operative to localize the objects within a field of view. The apparatus is used to, localize, or determine the position, of the objects by determining their position either relative to the host vehicle or to some global reference coordinate. Localizing may include determining the range azimuth and elevation angles of the target with respect to the host vehicle and its velocity. Furthermore, the apparatus 400 may be operative to determine which objects are static and what are dynamic helps in scene understanding, since there are very many radar echoes form static objects and much less from dynamic, in terms of computational complexity it requires to make sure that we allocate sufficient resources to dynamic objects. In addition, processing of radar echoes form dynamic vs. static objects may be very different. Typical scenario for automotive radar consists of multiple every strong, large size, echoes form static objects and few much weaker, small size, such as pedestrian, dynamic objects. Thus static objects can mask dynamic objects. Therefore it would be desirable to first to filter our radar echoes from the static object in order to detect dynamic objects.

The apparatus 400 has a first antenna 405 and a second antenna 410 for transmitting and receiving radar pulses. The antennas may be a single element antenna or an array of antenna elements, such as an antenna array wherein the elements of the antenna array are connected in a way in order to combine the received signals in a specified amplitude and phase relationships. Each of the antenna elements may be coupled to an amplifier and/or phase shifter.

Each of the first antenna 405 and the second antenna 410 may be a phased array, which employs a plurality of fixed antenna elements in which the relative phases of the respective signals fed to the fixed antenna elements may be adjusted in a way which alters the effective radiation pattern of the antenna array such the gain of the array is reinforced in a desired direction and suppressed in undesired directions. This has the desirable effect of allowing a stationary antenna array to be incorporated into a vehicle body while still allowing the field of view of the antenna to be increased.

The first antenna 405 and the second antenna 410 are coupled to a first A/D converter 415 and a second A/D converter 420 respectively. The first A/D converter 415 and the second A/D converter 420 are operative to convert the received radar echoes in the signal return path to a digital representation of the received radar echoes. The digital representations of the received radar echoes are coupled to a first digital signal processor 425 and a second digital signal processor 430 for further signal processing. The outputs of the first digital signal processor 425 and a second digital signal processor 530 are coupled to a joint signal processor 440.

The first digital signal processor 425 and the second digital processor 430 may be operative to perform range Doppler processing and to extract range Doppler bins of multiplied channels that exceed a detection threshold. The range Doppler processing involves performing a fast Fourier transform (FFT) in order to extract the range and Doppler information from the received signal spectrum. A 2D FFT may be used, allowing the system to analyze the frequency spectrum of a two dimensional signal matrix.

The joint signal processor 440 is operative to process the data received from the first digital signal processor 425 and a second digital signal processor 430 in order to perform object detection, object determination and recognition and parameter estimation. The joint signal processor 440 is further operative to track the determined objects according to aspects of the exemplary embodiments. The joint signal processor 440 may then generate an object list which is stored to memory 405 and may further be operative to generate an object map used for autonomous driving and/or obstacle avoidance.

The first antenna 405 and the second antenna 410 may be oriented in a manner where they are located a defined distance apart, but have overlapping fields of view (FOV). For example, the antennas may be situated on each side of the front of a vehicle facing forward. It would be desirable if we could improve the angular resolution of each of the two antennas by using the two antenna systems in concert. The angular resolution of the system can be increased by combining the multiple observation vectors of each antenna, wherein each observation vector would have the same reflection point angle, but would have different reflection coefficients.

Figure 5:
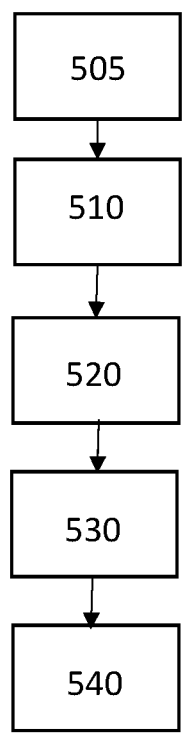
FIG. 5 shows an apparatus for static clutter mitigation for dynamic target localization 500.

Turning now to FIG. 5, a flowchart of a method for increased angular resolution utilizing multiple radars 500 is shown. The method is first operative to receive a first series of radar echoes from a first antenna and a second series of radar echoes from a second antenna 505. The method then determined a first observation vector from the first series of radar echoes and to determine a second observation vector from the second series of radar echoes 510 where the first and second observation vectors and indicative of the same target. The method is then operative to transform the observation vector of each radar to a fixed focal point, e.g. the center of the vehicle 520. The method then aligns the observation vectors to the focal point by a linear transformation 530. The method is then operative to increase the angular resolution by super resolution algorithms using the multiple observation vectors 540, wherein each of the observation vectors have different reflection coefficients. Target angle estimation may be determined by super resolution algorithm utilizing vectors from multiple sensors that are associated to the same reflection point. Super-resolution algorithms use information from several different observations in order to create one observation with greater resolution. The more observations that are used, the more information available for an observation and therefore the higher the resolution of the final observation. Algorithms may also extract details from different observations in a time sequence to reconstruct other frames.

Figure 6:
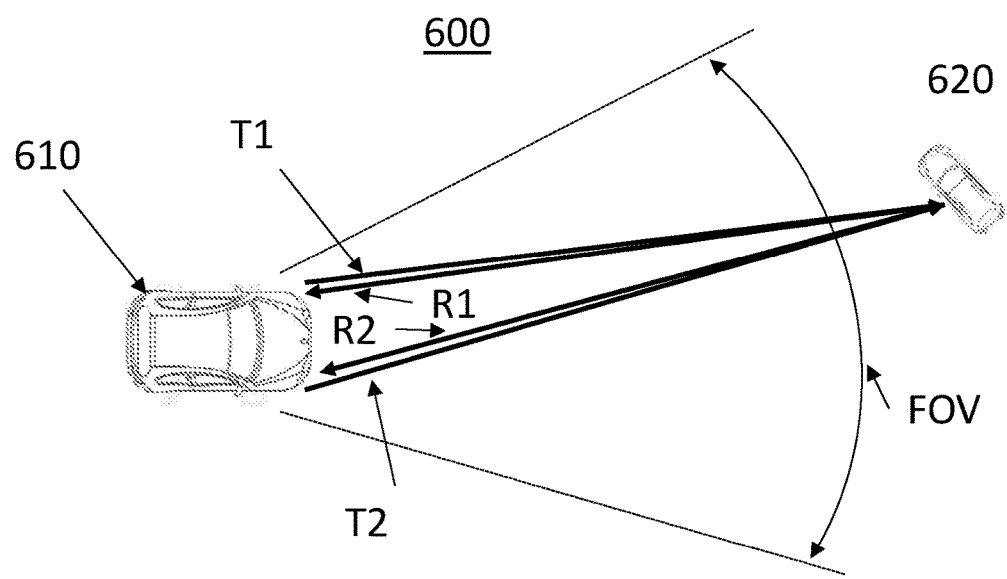
FIG. 6 shows a flowchart of a method for static clutter mitigation for dynamic target localization in accordance with an exemplary embodiment.

Turning now to FIG. 6, an exemplary environment for operating an apparatus for parallel radar signal processing 600 is shown. The exemplary apparatus, which in this example is operated in a vehicle 610, has two radar transceivers, which may have one or multiple channels. The first transceiver is operative to transmit a first radar signal T1 and to receive a first radar echo R1. The second transceiver is operative to transmit a second radar pulse T2 and to receive a second radar echo R2. During operation, the apparatus is able to steer the beams of each radar over a field of view FOV. The exemplary environment shows the first radar pulse T1 and the second radar pulse T2 incident on a target vehicle 620. The first radar echo R1 and the second radar echo R2 are returned to the vehicle. In can be observed that since the first and second radar pulses T1,T2 are incident on the target vehicle 620 at different angles, that the reflection coefficient from the vehicle will be different in response to the different amount of energy scattered from the vehicle. Thus, the first radar echo R1 and the second radar echo R2 will have different amplitudes and phases when they are received by their respective transceivers. The system may then be operative to A second exemplary embodiment may involve each of the radar transceivers receiving cross transmissions from other transceivers. In this configuration, the self and cross radar echoes have the same angle of arrival but they have different reflection coefficients. Therefore there are multiple observations with the same steering vectors but with different reflection coefficients. These observation may be utilized to obtain improved angular resolution with super resolution algorithms.

Another advantage of the utilization of multiple antenna arrays is that different radars with widely spaced antenna elements can be used in concert in order to eliminate ghost targets observed with widely spaced antenna elements. Radar systems with widely spaced antenna elements, such as those with two wavelength spacing, have angular ambiguity in that true targets have the same echo amplitude as ghost targets due to the gain of the antenna array. However, increasing the number of elements in an antenna array to increase the angular ambiguity, greatly increases the cost. For example, to being the spacing down to half a wavelength, the number of elements must be increased fourfold. Therefore, it would be desirable to utilize the other antenna arrays to improve the angular ambiguity problem. In this exemplary embodiment, radars with wide array aperture and widely spaced elements, such as spacing larger than half a wavelength are utilized. These radars attain high resolution at relatively low cost, but suffer from ambiguities in the angle measurements due to the widely spaced elements, and hence are not as effective for independent radar processing. However, multiple antenna arrays which utilize such antenna spacing can be used with multiple radars since the ambiguities can be resolved by intersecting the grating lobes from multiple radars.

According to an exemplary method, multiple radar arrays with widely spaced elements are employed to detect an object within a FOV. For each radar, multiple detections are made per range gate. The system is operative to determined detected points within the field of view. The system then determines which objects are intersecting at the same range from each of the multiple radars. The method is then operative to eliminate from tracking all detection points that do not intersect in a range.

Figure 7:
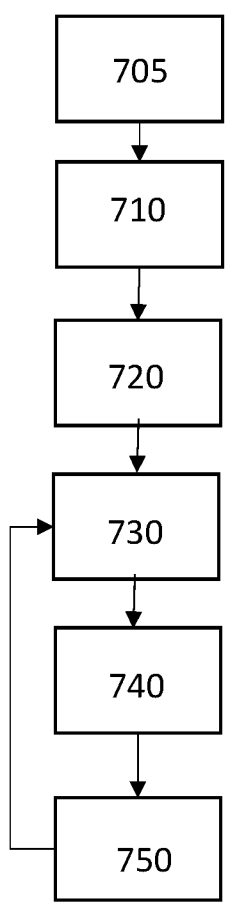
FIG. 7 shows a method for clustering a plurality of radar echoes in accordance with an exemplary embodiment.

Turning now to FIG. 7, a flowchart of another exemplary method for improving target angle of arrival and velocity estimation utilizing multiple radars 700 is shown. In this exemplary iterative method, where in each iteration the angle of arrival is estimates with the previous iteration estimation of the velocity, and then the velocity is estimated with the latest angle of arrivals estimations. The accuracy of the angle of arrival and the velocity estimations improves from one iteration to the other.

Initially the method is operative to receive a radar echo 710 via an antenna or an antenna array wherein the radar echo is a reflection from a target of a transmitted radar pulse. The method then detects the Doppler frequencies for the radar echoes 720. The method is then operative to filter the radar echoes at the estimated Doppler frequencies and to estimate the angle of arrival of the radar echoes 730. The method then estimates the velocity of the target in response to the estimated angle of arrival and the Doppler estimation 740. The method then estimates the Doppler frequencies from the estimated velocity and the estimated angle of arrivals 750. The system then returns to the filtering step with the newly estimated Doppler frequencies 730.

It will be appreciated that the disclosed methods, systems, and vehicles may vary from those depicted in the Figures and described herein. For example, the vehicle 10, the radar control system 12, the radar system 103, the controller 104, and/or various components thereof may vary from that depicted in FIGS. 1-3 and described in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method of processing radar target points comprising:
receiving a first radar signal indicating a first target and a second target within a first field of view at a first distance from a first location;
receiving a second radar signal indicating a third target and a fourth target with the first field of view at a second distance from a second location;
determining a true target in response to the first target and the third target being collocated;
determining a first observation vector in response to the first radar signal and the true target and a second observation vector in response to the second radar signal and the true target;
deducting the second target from the first radar signal and deducting the fourth target from the second radar signal;
determining a common observation vector in response to the first observation vector and the second observation vector;
generating a radar map in response to the common observation vector; and
controlling a vehicle in response to the radar map.

2. The method of claim 1 wherein the second target is deducted from the first radar signal and the fourth target is deducted from the second radar signal in response to the second target and the fourth target not being collocated.

3. The method of claim 1 further comprising generating a radar map in response to the first radar signal and the second radar signal.

4. The method of claim 3 wherein the radar map indicates the true target and not the second target.

5. The method of claim 1 wherein at the first radar signal is received by a first antenna at a first location and the second radar signal is received by a second antenna at a second location.

6. A method of resolving a radar target comprising:
receiving a first radar signal indicating a first target and a second target at a first range;
receiving a second radar signal indicating a third target and a fourth target at a second range;
determining a true target in response to the first range and the second range intersecting at the location of the first target and the third target;

determining a first observation vector in response to the first radar signal and the true target and a second observation vector in response to the second radar signal and the true target;

deducting the second target from the first radar signal and deducting the fourth target from the second radar signal;

determining a common observation vector in response to the first observation vector and the second observation vector;

generating a radar map in response to common observation vector and the true target; and controlling a vehicle in response to the radar map.

7. The method of claim 6 wherein the second target is deducted from the first radar signal and the fourth target is deducted from the second radar signal in response to the second target and the fourth target not being collocated.

8. The method of claim 6 further comprising generating a radar map in response to the first radar signal and the second radar signal.

9. The method of claim 8 wherein the radar map indicates the true target and not the second target.

10. The method of claim 6 wherein at the first radar signal is received by a first antenna at a first location and the second radar signal is received by a second antenna at a second location.

11. An apparatus comprising
a first antenna at a first location for receiving a first radar signal where the first radar signal indicates a first target and a second target at a first range;
a second antenna at a second location for receiving a second radar signal where the second radar signal indicates a third target and a fourth target at a second range
a processor coupled to the first antenna and the second antenna for determining that the first target and the third target are collocated, for determining a common observation vector in response to the first target and the third target and for deducting the second target from the first radar signal and the fourth target from the second radar signal; and
a controller for controlling a vehicle in response to the common observation vector.

12. The apparatus of claim 11 wherein the processor is operative to deduct the second target from the first radar signal and the fourth target from the second radar signal in response to the second target and the fourth target not being collocated.

13. The apparatus of claim 11 wherein the processor is further operative to generate a radar map in response to the first radar signal and the second radar signal.

14. The apparatus of claim 13 wherein the radar map indicates the first target and not the second target.

15. The apparatus of claim 11 wherein at least one of the first antenna and the second antenna are an antenna array.

16. The apparatus of claim 11 wherein the processor is further operative to generate a radar map in response to the first radar signal and the second radar signal for use in controlling an autonomous vehicle.

* * * * *